(12) United States Patent
Hammitt

(10) Patent No.: US 11,753,518 B1
(45) Date of Patent: Sep. 12, 2023

(54) CERAMIC COATINGS CONTAINING PARTICLES

(71) Applicant: Cast Masters LLC, Myrtle Beach, SC (US)

(72) Inventor: Richard Hammitt, Spring, TX (US)

(73) Assignee: Cast Masters LLC, Myrtle Beach, SC (US)

( * ) Notice: Subject to any disclaimer, the term of this patent is extended or adjusted under 35 U.S.C. 154(b) by 0 days.

(21) Appl. No.: 17/950,580

(22) Filed: Sep. 22, 2022

(51) Int. Cl.
| | |
|---|---|
| *C08K 3/013* | (2018.01) |
| *C09D 183/04* | (2006.01) |
| *C09D 7/63* | (2018.01) |
| *C09D 7/61* | (2018.01) |
| *C09D 5/18* | (2006.01) |
| *C08K 9/02* | (2006.01) |
| *C08K 3/04* | (2006.01) |
| *C08K 3/36* | (2006.01) |
| *C08K 3/22* | (2006.01) |

(52) U.S. Cl.
CPC ............ *C08K 3/013* (2018.01); *C08K 3/04* (2013.01); *C08K 3/36* (2013.01); *C08K 9/02* (2013.01); *C09D 5/18* (2013.01); *C09D 7/61* (2018.01); *C09D 7/63* (2018.01); *C09D 183/04* (2013.01); *C08K 2003/2241* (2013.01); *C08K 2003/2265* (2013.01); *C08K 2003/2289* (2013.01); *C08K 2201/005* (2013.01)

(58) Field of Classification Search
CPC .............................. C08K 3/013; B32B 15/015
See application file for complete search history.

(56) References Cited

U.S. PATENT DOCUMENTS 9,587,120 B2    3/2017    Klamklang et al.

FOREIGN PATENT DOCUMENTS

WO    WO-2017165634 A1 *    9/2017

* cited by examiner

*Primary Examiner* — Dah-Wei D. Yuan
*Assistant Examiner* — Andrew J Bowman
(74) *Attorney, Agent, or Firm* — Maskell Law PLLC; Benjamin E. Maskell

(57) ABSTRACT

The present disclosure relates to ceramic coatings containing particles for use in smelting devices and to methods of making ceramic coatings containing particles for use in smelting devices. More particularly, the disclosure relates to ceramic coatings comprising particles for improved heat reflection and durability of the ceramic coating.

12 Claims, No Drawings

CERAMIC COATINGS CONTAINING PARTICLES

FIELD OF THE INVENTION

The present disclosure relates to ceramic coatings containing particles for use in smelting furnaces and to methods of making ceramic coatings containing particles for use in smelting furnaces. More particularly, the disclosure relates to ceramic coatings comprising particles for improved heat reflection and durability of the ceramic coating.

BACKGROUND OF THE INVENTION

Smelting furnaces may be used to extract metals from ore and melt metals to form or cast them into desired shapes. Smelting furnaces may operate at high temperatures, often up to 1,100° C. or higher. Achieving and holding these high temperatures is critical for the operation of a smelting furnace. Industrial smelting furnaces may be large and use a wide variety of fuel sources to heat. Small smelting furnaces designed for home use are also known. These smaller, at home smelting furnaces may be heated by burning propane gas. As such, it can be difficult to heat to a sufficiently high temperature or to maintain sufficiently high temperatures in small smelting furnaces. Additionally, the supply of propane gas may be a finite source such as a propane tank. Small smelting furnaces require a continuous supply of propane gas in order to maintain temperature. It would be desirable to maximize the amount of time a small smelting furnace could operate on a fixed source of fuel, such as a propane tank.

Insulating coatings for smelting furnaces are known. The insulating coatings may help keep a furnace at an even temperature and/or reduce the amount of energy required to maintain the high temperature. Smelting furnaces may be insulated with ceramic coatings. These ceramic coatings can be resistant to the high temperatures of the smelting furnace while helping to reflect heat into the furnace. These insulating ceramic coatings may also help keep the temperature of the outside of the furnace lower. This is particularly useful for small smelting furnaces that may be operated by a novice enthusiast as the high temperature can be dangerous if accidentally contacted by the user. While insulating coatings are known, there is a need for more efficient ceramic coatings that reflects infrared (IR) light as well as thermal energy to help maintain the smelting furnace internal temperature, reduce the fuel required to heat and maintain the heat of the smelting furnace, and reduce the external temperature of the smelting furnace to improve the safety of the user.

Surprisingly, it has been found that formulating a ceramic coating with particles and applying the ceramic coating with particles to a smelting furnace improves the insulation capability of the smelting furnace and reduces the external temperature of the smelting furnace. Reaction cured glasses and pigments were found to be useful particles for incorporating into the ceramic coating and improving the thermal insulation capability and thermal stability and durability of the ceramic coating.

SUMMARY OF THE INVENTION

A ceramic coating comprises from about 60% to about 70% by weight of the ceramic coating of a siloxane-polyether polymer that comprises from about 40% to 60% by weight of the siloxane-polyether of poly(oxy-1,2-ethanediyl), alpha-[3-[1,3,3,3-tetramethyl-1-[(trimethylsilyl)oxy]disiloxanyl]propyl]-omega-hydroxy; and from about 40% to about 60% by weight of the siloxane-polyether of pentamethyldisiloxane from about 10% to about 20% by weight of the ceramic coating of a reaction cured glass and from about 15% to about 20% by weight of the ceramic coating of a pigment wherein the ceramic coating has a thickness from about 50 microns to about 250 microns.

A method of making a ceramic coating, the method comprising the steps of creating a reaction cured glass comprising the steps of combining from about 45% to 55% by weight of the reaction cured glass pre-mix of a glass, from about 30% to about 40% by weight of the reaction cured glass pre-mix of water, from about 15% to about 20% by weight of the reaction cured glass pre-mix of ethanol, and from about 1% to about 2% by weight of the reaction cured glass pre-mix of boric anhydride, heating the reaction cured glass pre-mix to a temperature of about 80° C. to about 90° C. and mixing for about 10 minutes to about 20 minutes, drying the reaction cured glass pre-mix for at least 16 hours at a temperature from about 65° C. to about 75° C. and sintering the reaction cued glass; pre-mix for about 0.5 to about 3 hours at about 1,100° C. and filtering the reaction cured glass pre-mix, creating a ceramic coating pre-mix by combining from about 35% to about 45% by weight of the ceramic coating pre-mix of a hydrocarbon carrier, from about 15% to about 25% by weight of the ceramic coating pre-mix of poly(oxy-1,2-ethanediyl),alpha-[3-[1,3,3,3-tetramethyl-1-[(trimethylsilyl)oxy]disiloxanyl]propyl]-omega-hydroxy, from about 15% to about 25% by weight of the ceramic coating pre-mix of pentamethyldisiloxane, from about 5% to about 15% by weight of the ceramic coating pre-mix of the reaction cured glass, and from about 5% to about 15% by weight of the ceramic coating pre-mix of a pigment and applying the ceramic coating pre-mix to a metal surface at a thickness of about 50 microns to about 400 microns; and heating the metal surface to about 900 CC to about 1,000° C. for about 0.5 to about 1 hours.

A ceramic coating consisting essentially of from about 60% to about 70% by weight of the ceramic coating of a siloxane-polyether polymer wherein the siloxane-polyether polymer consists essentially of from about 45% to 55% by weight of the siloxane-polyether of poly(oxy-1,2-ethanediyl),alpha-[3-[1,3,3,3-tetramethyl-1-[(trimethylsilyl)oxy]disiloxanyl]propyl]-omega-hydroxy and from about 45% to about 55% by Wight of the siloxane-polyether of pentamethyldisiloxane, from about 15% to about 20% by weight of the ceramic coating of a reaction cured glass wherein the reaction cured glass is a porous glass treated with boron oxide and the reaction cured glass has a maximum particle size of 45 microns or less, from about 5% to about 10% by weight of the ceramic coating of a first inorganic pigment wherein the first inorganic pigment is titanium dioxide and from about 8% to about 12% by weight of the ceramic coating of a second inorganic pigment wherein the second inorganic pigment is iron cobalt chromite black, wherein the ceramic coating has a thickness from about 50 microns to about 100 microns.

DETAILED DESCRIPTION OF THE INVENTION

Features and benefits of the various embodiments of the present invention will become apparent from the following description, which includes examples of specific embodiments intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, articles such as "a" and "an" when used in a claim, are understood to mean one or more of what is claimed or described.

As used herein, the terms "include", "includes" and "including" are meant to be non-limiting.

The term "substantially free of" or "substantially free from" as used herein refers to either the complete absence of an ingredient or a minimal amount thereof merely as impurity or unintended byproduct of another ingredient. A composition that is "substantially free" of/from a component means that the composition comprises less than about 0.5%, less than about 0.25%, less than about 0.1%, less than about 0.05%, or less than about 0.01% by weight of the composition, of the component.

The term "cross-linking agent" as used herein refers to monomers with two or more reactive sites and function to create branched or cross-linked polymers.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated. It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Ceramic Coating Containing Particles

The ceramic coatings described herein are solids often present as a film adhered to a metal, preferably a painted metal surface on the inside of a smelting furnace. The ceramic coatings contain one or more particles that may improve the IR light reflection, insulation capacity and/or the durability of the ceramic coating. The ceramic coating may comprise from about 50% to about 90%, or from about 60% to about 80%, or from about 65% to about 68% of a siloxane-polyether copolymer (described in detail below). The ceramic coating may comprise one or more particles in the form of reaction cured glass particles, pigments and mixtures thereof. The ceramic coating may comprise from about 10% to about 40%, or from about 20% to about 35% or from about 30% to 35% by weight of the ceramic coating of one or more particles. The ceramic coating may have a thickness from about 30 microns to about 300 microns, or from about 40 microns to about 250 microns, or from about 50 microns to about 200 microns.

Siloxane-Polyether Copolymers

The ceramic coating may comprise a siloxane-polyether copolymer. Siloxane-polyether copolymers may be linear, branched, or cross-linked. In one embodiment, the siloxane-polyether copolymer is a linear copolymer, and the polymerization/curing step is carried out in a composition that is substantially free of cross-linking agents. The siloxane-polyether copolymer may function to create the bulk (e.g., greater than 50 percent by weight of the ceramic coating) of the ceramic coating and entrap the particles. Siloxane-polyether copolymers may be synthesized with the monomer pentamethyldisiloxane and at least a second monomer. Examples of suitable second monomers include 1,1,1,3,5,5,5-heptamethyltrisiloxane, 1,1,3,3-tetramethyldisiloxane, 1,1,3,3,5,5-Hexamethyltrisiloxane, tris(trimethylsiloxy)silane, and poly(oxy-1,2-ethanediyl), alpha-[3-[1,3,3,3-tetramethyl-1-[(trimethylsilyl)oxy]disiloxanyl]propyl]-omega-hydroxy. The second monomer may be described as

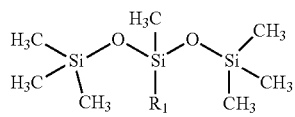

where $R_1$ may be H or an alkyl moiety that may further comprise one or more moieties selected form the group consisting of ethylene oxide, propylene oxide, hydroxyl, amine, ester, and amid. In an example, $R_1$ may comprise from about 1 to about 6 carbon atoms, from about 1 to about 4 oxygen atoms and from about 5 to about 12 hydrogen atoms.

An example of a siloxane-polyether copolymer is

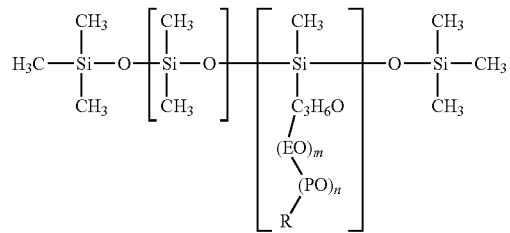

where EO is an ethylene oxide moiety, PO is a propylene oxide moiety, m and n are integers independently selected from 0 to 10; and R is selected from OH, $NH_3$, and a C1-C4 alkyl group.

In an example, the siloxane-polyether is synthesized using the monomers pentamethyldisiloxane and poly(oxy-1,2-ethanediyl),alpha-[3-[1,3,3,3-tetramethyl-1-[(trimethylsilyl)oxy]disiloxanyl]propyl]-omega-hydroxy. The siloxane-polyether may be substantially free of cross-linking agents. The siloxane-polyether may comprise from about 40% to about 60%, or from about 45% to about 55%, or about 50% by weight of the siloxane-polyether of pentamethyldisiloxane. The siloxane-polyether may comprise from about 40% to about 60%, or from about 45% to about 55%, or about 50% by weight of the siloxane-polyether of poly(oxy-1,2-ethanediyl),alpha-[3-[1,3,3,3-tetramethyl-1-[(trimethylsilyl)oxy]disiloxanyl]propyl]-omega-hydroxy. The ceramic coating may further comprise unreacted monomer or monomers used in the synthesis of the siloxane-polyether depending on the weight ratios of monomers used and the reaction conditions. Alternatively, the ceramic coating may be treated (e.g., chemically, with heat) to extract, evaporate, degrade or otherwise remove unreacted monomer and, as such, the ceramic coating may be substantially free of monomers used in the synthesis of the siloxane-polyether.

The ceramic coating siloxane-polyether may be synthesized in the presence of one or more particles. This may cause the particles to become entrapped within the coating either physically, chemically or both. The particles may be inert and not involved in the polymerization process. The particles may be capable of reacting with the polymer during the synthesis process or after the polymerization process by interacting with a polymer pendent moiety.

The ceramic coating may comprise from about 50% to about 95%, or from about 55% to about 90% or from about 60% to about 80% or about 66% by weight of the ceramic coating of a siloxane-polyether. The ceramic coating may comprise from about 50% to about 95%, or from about 55% to about 90% or from about 60% to about 80% or about 66% by weight of the ceramic coating of a siloxane-polyether synthesized using a first monomers pentamethyldisiloxane and a second monomer poly(oxy-1,2-ethanediyl), alpha-[3-[1,3,3,3-tetramethyl-1-[(trimethylsilyl)oxy]disiloxanyl]propyl]-omega-hydroxy wherein the weight ratio of the first monomer to the second monomer is from about 2:1 to about 1:2, or about 1:1.

Reaction Cured Glass Particles

The ceramic coating may comprise a reaction cured glass in the form of particles. Reaction cured glass particles may be prepared by reacting a porous silica glass with boron oxide. Porous silica glasses are described in U.S. Pat. No. 2,286,275. U.S. Pat. No. 4,220,461 provides a historical perspective and discussion on the development of silica-rich phase-separable porous glass. Various methods for the manufacture of phase-separable porous glass are reviewed in U.S. Pat. No. 4,528,010 and the structure of porous silica glass is described in Wiltzius et al., Phys. Rev. A., 36(6), 2991, (1987) entitled "Structure of Porous Vycor Glass." An example of a porous glass is VYCOR® 7930 which is commercially available from Corning, Inc. Corning, NY.

A reaction cured glass may be prepared by combining a porous glass, water, a $C_1$-$C_3$ alcohol (e.g., ethanol) and boric anhydride, heating to a temperature from about 75° C. to about 90° C., or to about 85° C., and mixing for a period from about 10 minutes to about 20 minutes, or about 15 minutes. The mixture may thicken during this time and may even become too thick to mix. After mixing, the composition is dried at a temperature of about 70° C. for a period of about 12 hours to about 24 hours, or about 16 hours to remove any remaining volatiles. The dried composition may be filtered using a 10 mesh to about a 20 mesh, or a 16 mesh screen before sintering for about one hour at a temperature from about 1,000° C. to about 1,200° C. or about 1,100° C. The reaction cured glass may be milled, for example using a ball mill, to reduce the particle size. The resulting reaction cured glass may be further filtered through a 240 mesh to about a 500 mesh, or a 280 mesh to about a 400 mesh, or 320 mesh screen. The reaction cured class may have a maximum particle size from about 19 microns to about 53 microns, or from about 23 microns to about 44 microns, or about 36 microns.

The ceramic coating may comprise from about 1% to about 30%, or from about 2% to about 25% or from about 5% to about 20% or about 17% by weight of the ceramic coating of a reaction cured glass.

Pigments

The ceramic coating may comprise a pigment. Pigments are particles that modify the color of the ceramic coating. The change in color may be for aesthetic purposes and/or to improve the thermal or insulating properties of the ceramic coating. Pigments may be organic or inorganic, preferably the pigment is inorganic. Examples of metals that form inorganic pigments include aluminum, arsenic, barium, bismuth, copper, cadmium, cobalt, chromium, gold, iron, lead, titanium, tin, zinc, manganese, and mercury.

Inorganic pigments are available in a range of colors including purple, blue, green, yellow, orange, red, brown, black and white. Examples of purple inorganic pigments include Ultramarine violet (PV15), Han purple, Cobalt violet (PV14), and manganese violet (PV16). Examples of blue inorganic pigments include ultramarine (PB29), persian blue, cobalt blue, cerulean blue (PB35), cerium uranium blue, Egyptian blue, han blue, azurite, copper carbonate, Prussian blue (PB27), YInMn blue, and manganese blue. Examples of green inorganic pigments include cadmium green, chrome green (PG17), viridian (PG18), cobalt green, malachite, scheele's green, and green earth. Examples of yellow inorganic pigments include orpiment, primrose yellow (PY184), cadmium yellow (PY37), chrome yellow (PY34), aureolin (PY40), yellow ochre (PY43), naples yellow (PY41), lead-tin-yellow, titanium yellow, mosaic gold, and zinc yellow (PY36). Examples of orange inorganic pigments include bismuth vanadate orange (PO83), cadmium orange (PO20), and chrome orange. Examples of red inorganic pigments include realgar, cadmium red (PR108), cerium sulfide red (PR265), sanguine (PR102), red ochre (PR102), burnt sienna (PBr7), red lead, and vermilion. Examples of brown pigments include raw umber (PBr7), chrome iron brown (PBr29), and raw sienna (PBr7). Examples of black inorganic pigments include carbon black (PBk7), ivory black (PBk9), vine black (PBk8), lamp black (PBk6), mars black (PBk11), iron cobalt chromite back (PBk27), manganese dioxide, and titanium black. Examples of white inorganic pigments include antimony white, barium sulfate, lithopone, cremnitz white (PW1), titanium dioxide (PW6), zinc white (PW4), and sachtolith. An example of a black inorganic pigment is iron cobalt chromite black (PBk27) commercially available as SICOPAL® Black K 0095 from BASF Ludwigshafen, Germany. An example of a white inorganic pigment is titanium dioxide.

In an example, the ceramic coating comprises two inorganic pigments. The weight ratio of the first inorganic pigment to the second inorganic pigment may be from about 10:1 to about 1:10, from about 5:1 to about 1:5, from about 1:3 to about 3:1, from about 1:2 to 2:1, or about 1:2. The first inorganic pigment may be a white inorganic pigment and the second inorganic pigment may be a black inorganic pigment. The white inorganic pigment may be a titanium dioxide pigment and the black inorganic pigment may be iron cobalt chromite black.

The ceramic coating may comprise from about 1% to about 30%, or from about 2% to about 25% or from about 5% to about 20% or about 17% by weight of the ceramic coating of a pigment. The ceramic coating may comprise from about 1% to about 30%, or from about 2% to about 25% or from about 5% to about 20% or about 17% by weight of the ceramic coating of an inorganic pigment. The ceramic coating may comprise a first inorganic pigment and a second inorganic pigment. The first inorganic pigment may comprise from about 1% to about 20%, or from about 2% to about 15% or from about 3% to about 10% or about 6% by weight of the ceramic coating of an inorganic white pigment. The second inorganic pigment may comprise from about 1% to about 25%, or from about 2% to about 20% or from about 5% to about 15% or about 11% by weight of the ceramic coating of a black inorganic pigment. The first inorganic pigment may be titanium dioxide. The second inorganic pigment may be iron cobalt chromite black.

The pigment may be milled, for example using a ball mill, to reduce the particle size. The pigment may be filtered through a mesh screen to control the particle size. In an example, a pigment is screened through a 240 mesh to about a 500 mesh or through a 280 mesh to about a 400 mesh. The pigment may have a maximum particle size from about 19 microns to about 53 microns, or from about 23 microns to about 44 microns.

Hydrocarbon Solvents

During the preparation of the ceramic coating, the siloxane-polyether monomers and particles used to synthesize the ceramic coating may be dispersed in a hydrocarbon solvent. Hydrocarbon solvents are liquid at 25° C. and comprise one or more hydrocarbons. An example of a hydrocarbon solvent is naphtha. Naphtha is a hydrocarbon mixture that may be produced from natural gas condensates, petroleum distillates, and the distillation of coal tar and peat. Naphtha may include crude oil and refined products such as kerosene. Naphtha may be untreated or treated. An example of a treated naphtha is hydrotreated naphtha. The hydrocarbon solvent may be substantially free of water.

EXAMPLES

Example 1. A Method for Preparing a Reaction Cured Glass

Reaction cured class may be prepared according to the composition shown in Table 1. Boric anhydride and water are combined in a container, warmed to 85° C., and mixed for 5 minutes at 85° C. The VYCOR® 7930 and ethanol are then added and the mixture stirred for 15 minutes at 85° C. The resulting mixture is dried at 70° C. for 16 hours and filtered through 16 mesh screen. The resulting powder is sintered at about 1,100° C. for one hour, milled by ball mill for 15 minutes and then filtered through a 325 mesh filter. The result is a reaction cured glass treated with boron oxide.

TABLE 1

Example of a composition used to make a reaction cured glass

| Ingredient | Wt. % |
| --- | --- |
| VYCOR ® 7930* | 48.6 |
| Deionized water | 33.1 |
| Ethanol** | 16.8 |
| Boric anhydride | 1.5 |

*Pours glass commercially available from Corning Inc., Corning, NY
**190 proof denatured ethanol Example 2. A Method for Preparing a Pigment A blend of pigments as described in Table 2 may be prepared by combining the pigments by weight and milling for 30 minutes using a ball mill.

TABLE 2

Example of a composition used to make a pigment

| Ingredient | Wt. % |
| --- | --- |
| SICOPAL ® Black K 0095* | 65 |
| Titanium dioxide | 35 |

*Commercially available from BASF, Ludwigshafen, Germany

Example 3 A Method for Preparing a Ceramic Coating Containing Particles

A ceramic coating is prepared by combining the ingredients in Table 3 in a container and mixing for 5 minutes at 25° C. The mixture is spread onto a painted metal surface to a thickness of about 85 microns and heated to 1,000° C. for 2 hours to cure.

TABLE 3

An example of a composition used to make a ceramic coating containing particles

| Ingredient | Wt. % |
| --- | --- |
| Naphtha(petroleum) hydrotreated, heavy | 40 |
| Poly(oxy-1,2-ethanediyl),alpha-[3-[1,3,3,3-tetramethyl-1-[(trimethylsilyl)oxy]disiloxanyl]propyl]-omega-hydroxy | 20 |
| Pentamethyldisiloxane | 20 |
| Reaction cured glass* | 10 |
| Pigment** | 10 |

*According to Example 1 above
**According to Example 2 above

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A ceramic coating comprising:
   a. from about 60% to about 70% by weight of the ceramic coating of a siloxane-polyether polymer derived from:
      i.) about 40% to about 60% by weight of the siloxane-polyether of poly(oxy-1,2-ethanediyl),alpha-[3-[1,3,3,3-tetramethyl-1-[(trimethylsilyl)oxy]disiloxanyl]propyl]-omega-hydroxy; and
      ii.) about 40% to about 60% by weight of the siloxane-polyether of pentamethyldisiloxane;
   b. from about 10% to about 20% by weight of the ceramic coating of a reaction cured glass; and
   c. from about 15% to about 20% by weight of the ceramic coating of a pigment;
   wherein the ceramic coating has a thickness from about 50 microns to about 250 microns.

2. The ceramic coating of claim 1, wherein the reaction cured glass is a porous glass treated with boron oxide.

3. The ceramic coating of claim 2, wherein the reaction cured glass has a maximum particle size of 45 microns or less.

4. The ceramic coating of claim 1, wherein the ceramic coating comprises a first pigment and a second pigment, wherein the first pigment is titanium dioxide and the second pigment is iron cobalt chromite black.

5. The ceramic coating of claim 4, wherein the weight ratio of the first pigment to the second pigment is about 1:2.

6. The ceramic coating of claim 3, wherein the ceramic coating resides on a painted metal surface.

7. The ceramic coating of claim 1, wherein the siloxane-polyether polymer is substantially free of cross linkers.

8. A ceramic coating consisting essentially of:
   a. from about 60% to about 70% by weight of the ceramic coating of a siloxane-polyether polymer derived from:
      i.) about 45% to about 55% by weight of the siloxane-polyether of poly(oxy-1,2-ethanediyl),alpha-[3-[1,3,3,3-tetramethyl-1-[(trimethylsilyl)oxy]disiloxanyl]propyl]-omega-hydroxy; and
      ii.) about 45% to about 55% by weight of the siloxane-polyether of pentamethyldisiloxane;
   b. from about 15% to about 20% by weight of the ceramic coating of a reaction cured glass wherein the reaction cured glass is a porous glass treated with boron oxide and the reaction cured glass has a maximum particle size of 45 microns or less;
   c. from about 5% to about 10% by weight of the ceramic coating of a first inorganic pigment wherein the first inorganic pigment is titanium dioxide; and
   d. from about 8% to about 12% by weight of the ceramic coating of a second inorganic pigment wherein the second inorganic pigment is iron cobalt chromite black;
   wherein the ceramic coating has a thickness from about 50 microns to about 100 microns.

9. The ceramic coating of claim 5, wherein the ceramic coating resides on a painted metal surface.

10. The ceramic coating of claim 8, wherein the ceramic coating resides on a painted metal surface.

11. The ceramic coating of claim 1, wherein the ceramic coating resides within a smelting furnace.

12. The ceramic coating of claim 8, wherein the painted metal surface resides within a smelting furnace.

* * * * *